(12) United States Patent
Choy et al.

(10) Patent No.: US 6,974,641 B1
(45) Date of Patent: Dec. 13, 2005

(54) THERMAL BARRIER COATING WITH THERMOLUMINESCENT INDICATOR MATERIAL EMBEDDED THEREIN

(75) Inventors: Kwang-Leong Choy, Coventry (GB); Andrew Lawrence Heyes, Berkshire (GB); Joorg Feist, London (GB)

(73) Assignee: Southside Thermal Sciences (STS) Limited, London (GB)

( * ) Notice: Subject to any disclaimer, the term of this patent is extended or adjusted under 35 U.S.C. 154(b) by 0 days.

(21) Appl. No.: 09/890,193

(22) PCT Filed: Jul. 26, 1999

(86) PCT No.: PCT/GB99/02413

§ 371 (c)(1),
(2), (4) Date: Jul. 26, 2001

(87) PCT Pub. No.: WO00/06796

PCT Pub. Date: Feb. 10, 2000

(30) Foreign Application Priority Data

| | | |
|---|---|---|
| Jul. 27, 1998 | (GB) | ................................. 9816348 |
| Oct. 29, 1998 | (GB) | ................................. 9823749 |

(51) Int. Cl.$^7$ .................. B32B 15/04; G01N 21/64
(52) U.S. Cl. ................. 428/704; 428/632; 428/655; 428/656; 428/469; 374/161; 250/458.1; 250/459.1; 250/462.1; 250/361 R; 250/382
(58) Field of Search ................ 428/469, 704, 428/632, 655, 656; 250/458.1, 459.1, 462.1, 250/361 R, 362; 374/161

(56) References Cited

U.S. PATENT DOCUMENTS

| | | | |
|---|---|---|---|
| 4,075,493 A | | 2/1978 | Wickersheim |
| 4,560,286 A | * | 12/1985 | Wickersheim |
| 4,569,570 A | | 2/1986 | Brogardh et al. |
| 4,774,150 A | | 9/1988 | Amano et al. |
| 4,922,113 A | | 5/1990 | Melancon |
| 5,270,116 A | | 12/1993 | Melancon et al. |
| 5,730,528 A | | 3/1998 | Allison et al. |
| 6,073,358 A | | 6/2000 | Nguyen |
| 6,175,111 B1 | | 1/2001 | Sorita et al. |

FOREIGN PATENT DOCUMENTS

| | | |
|---|---|---|
| EP | 0 336 029 | 10/1989 |
| EP | 0 863 396 | 3/1998 |
| WO | 98/10459 | 3/1998 |

OTHER PUBLICATIONS

Patent Abstracts of Japan, Publ. No. 10-246619, Appln. No. 09-047981 (Sep. 1998).

* cited by examiner

*Primary Examiner*—Jennifer McNeil
(74) *Attorney, Agent, or Firm*—Renner, Otto, Boisselle & Sklar, LLP

(57) ABSTRACT

A coating material (20) for coating a machine component (10), especially a gas turbine or a part thereof, comprises a mixture of at least a refractory material and an indicator material having an optical emission (e.g. fluorescence) spectrum which varies in response to a physical parameter of the coated component. In a preferred embodiment, the coating consists of yttrium aluminium garnet (YAG) or yttrium stabilised zirconium. The dopant is preferably a rare earth metal, e.g. Eu, Tb, Dy.

30 Claims, 7 Drawing Sheets

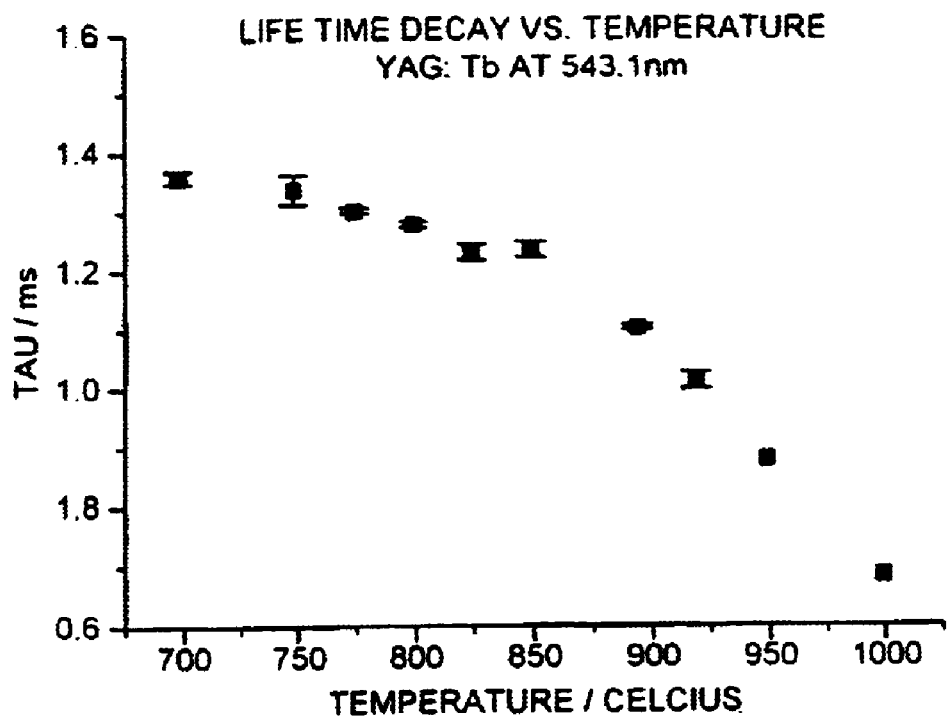
FIG. 5
FIG. 6
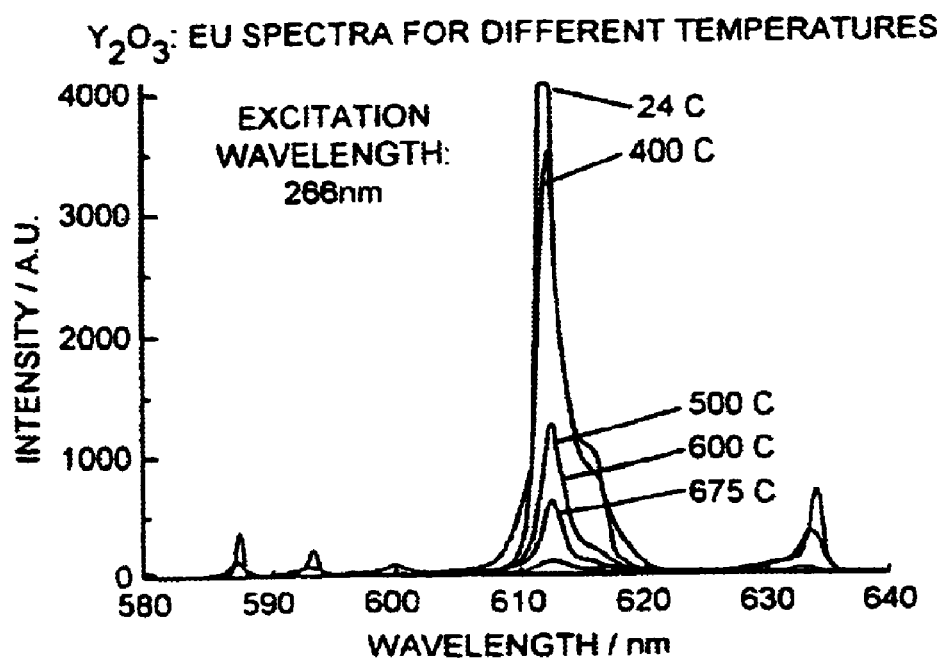

THERMAL BARRIER COATING WITH THERMOLUMINESCENT INDICATOR MATERIAL EMBEDDED THEREIN

This invention relates to coatings, such as thermal barrier coatings.

In extreme environments such as the interior of a gas turbine engine, where the flame temperature can be greater than the melting point of materials used to construct the engine, metal components are often coated with a material to avoid or reduce thermal damage to the components. Such a coating is commonly known as a thermal barrier coating or TBC.

A thermal barrier coating typically comprises a relatively "thick" layer of a refractory or thermally insulating material such as yttria stabilised zirconia or YSZ. Here, the term "thick" is used to imply a thickness of, say, 250 $\mu$m. The refractory material would generally be selected to have a low thermal conductivity such as around 1 to 3 W/mK, thereby reducing heat transfer to the components and reducing the temperature experienced by the components.

The coatings are applied using a deposition technique. Generally speaking, the deposition techniques in commercial use are not completely reliable and do not provide the level of adhesion of the coating to the component which would be desirable. This means that the lifetime of coated components is limited, but as there is no reliable model for predicting that lifetime, nor a convenient way to monitor the coatings in service, the only way to assess the state of coated components is manual inspection. In the case of a gas turbine engine, this is clearly time consuming and expensive.

A typical regime for coating a machine component with a thermal barrier coating is to apply a sandwich of three types of coating. First, a so-called bondcoat is applied. A typical material for the bondcoat is a metallic layer such as an MCrAlY alloy layer. The purpose of the bondcoat is to provide a layer which adheres well to the underlying component surface and which provides a good base for further coatings. Onto the bondcoat a so-called intermediate layer or interlayer is applied. A ceramic material such as $Al_2O_3$ is one example of a suitable material. This can be formed by oxidising the surface of the bondcoat to form a thin (e.g. 0.1 to 10 $\mu$m) oxide layer. Again, this provides improved adhesion for the final thermally insulating coating and is not there to provide thermal barrier properties.

The bondcoat and the interlayer may be referred to generally as priming layers, as their main purpose is to improve adhesion and application of the final, thermally insulating layer.

The final layer provides the thermal insulating and structural properties of the TBC. As mentioned above, this may be a relatively thick layer of a material such as YSZ, YPSZ (Yttria partially stabilised zirconia, e.g. 6–8 wt % $Y_2O_3$ PSZ) or zirconia doped alumina. Basically the outer layer should ideally be: thermally insulating (and so could be referred to as a refractory material), have low thermal conductivity, be resistant to spalling during thermal cycling and/or exposure to high temperatures (e.g. over 1100° C.), be resistant to oxidation and be resistant to erosion.

So, for example, the material of the interlayer (e.g. $Al_2O_3$) is not suitable for use as the outermost layer because its reliability is not good enough and because it lacks the "transformation toughening" obtainable with YPSZ.

EP-A-0 863 396 discloses a technique for detecting stress in an interlayer of the type of structure described above. It is noted that Cr impurities, originating in the bondcoat, are often present in the interlayer. EP-A-0 863 396 makes use of the change in the fluorescence wavelength of these impurities in response to stress. A light source is directed through the thermally insulating layer onto the interlayer and the resulting fluorescence wavelength is detected.

U.S. Pat. No. 4,922,113, U.S. Pat. No. 5,270,116 and EP-A-0 336 029 disclose techniques for monitoring the composition, thickness or uniformity of a coating by detecting fluorescence radiation.

This invention provides a machine component coated with a coating material, the coating material comprising a mixture of at least a thermally insulating material and an indicator material having an optical emission spectrum which varies in response to a physical parameter of the coated component.

The invention addresses the above difficulties by providing a new type of coating, suitable for use as a thermal barrier coating. The coating itself comprises not only a refractory material but also an indicator material having an optical emission (e.g. fluorescence) spectrum dependent on a physical parameter of the coated component such as temperature. This allows in-situ interrogation and remote monitoring of the physical parameter by directing a light beam onto the component and analysing the fluorescence spectrum using known analysing equipment.

Unlike the arrangement of EP-A-0 863 396, the indicator material can form part of the actual TBC layer rather than an interlayer. This means that the temperature, stress etc. of the TBC layer can be monitored rather than that of the interlayer alone. This can enable the detection of faults across the top (TBC) coating and at the interface between the TBC coating and the interlayer or other priming coating.

The variation in spectrum can be, for example, a variation of absolute intensity, relative intensity between two or more emission lines, decay time of one or more emission lines after excitation by a pulsed light source, or even lineshifting due to expansion and contraction of the host crystal lattice.

The invention has many advantages over another previously proposed technique involving painting special phosphor-loaded paints onto components. Because the indicator material forms part of the coating, it can be much more resistant to erosion and thermal shock than a surface layer of paint. A separate painting process is not required. Also, the indication given by the indicator material better reflects the true condition of the coated component, rather than just a surface condition of the phosphor paint.

Although coating materials could be selected to respond to other physical parameters of the coated component, such as pressure, preferred embodiments of the invention finds particular use in allowing remote monitoring of the temperature of the component, by employing an indicator material having a fluorescence spectrum which varies in dependence on the temperature of at least a region of the coated component. In particular it is noted that the documents listed above are not concerned with temperature measurement. However, embodiments of the invention encompass materials which respond to two or more physical parameters, perhaps in different ways.

Preferably, rather than a homogeneous layer of indicator material, the indicator material comprises a layered structure of indicator materials having different respective fluorescence spectra. This arrangement has many advantages. Firstly, as the coating erodes from the component, a further layer of indicator material will be newly uncovered. As this has a distinguishable spectrum, the erosion process can therefore be detected. In another application, the arrangement could allow monitoring of the component's temperature at different depths within the coating, particularly if lower layers of indicator material were covered by materials which are at least partially transparent to the light involved.

The invention finds a particular preferred use in high temperature components in, for example, a combustion engine, preferably in coating one or more turbine blades or heat shields of a gas turbine engine. In combustion engines, ambient conditions are extreme and the effort involved in manually inspecting internal components means that the inspection process can be expensive.

The invention also provides a coating material for coating a machine component, the coating material comprising a mixture of at least a refractory material and an indicator material having an optical emission spectrum which varies in response to a physical parameter of the coated component.

The invention also provides a combustion engine having one or more internal components coated with the above, the engine having a measurement system comprising a light source for directing an interrogating light beam onto the coated component(s); and a light collector for collecting light from the coated component(s).

Embodiments of the invention will now be described, by way of example only, with reference to the accompanying drawings in which:

FIGS. 4 and 5 illustrate the variation of decay lifetime with temperature for an emission of YAG:Tb;

FIG. 6 illustrates a fluorescence spectrum for $Y_2O_3$:Eu;

FIG. 1 is a schematic diagram of a component 10 coated with a thermal barrier coating (TBC) 20. The component 10 may be, for example, a turbine blade of a gas turbine engine, although the technique is applicable to many other types of component.

The TBC 20 is formed as a mixture of a refractory material and an indicator material which has a fluorescence spectrum which varies in dependence on a physical parameter of the component such as temperature.

Figure 1:
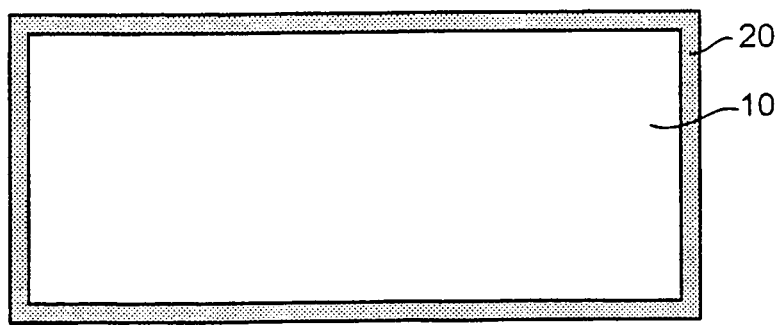
FIG. 1 is a schematic diagram of a coated component.
Figure 2:
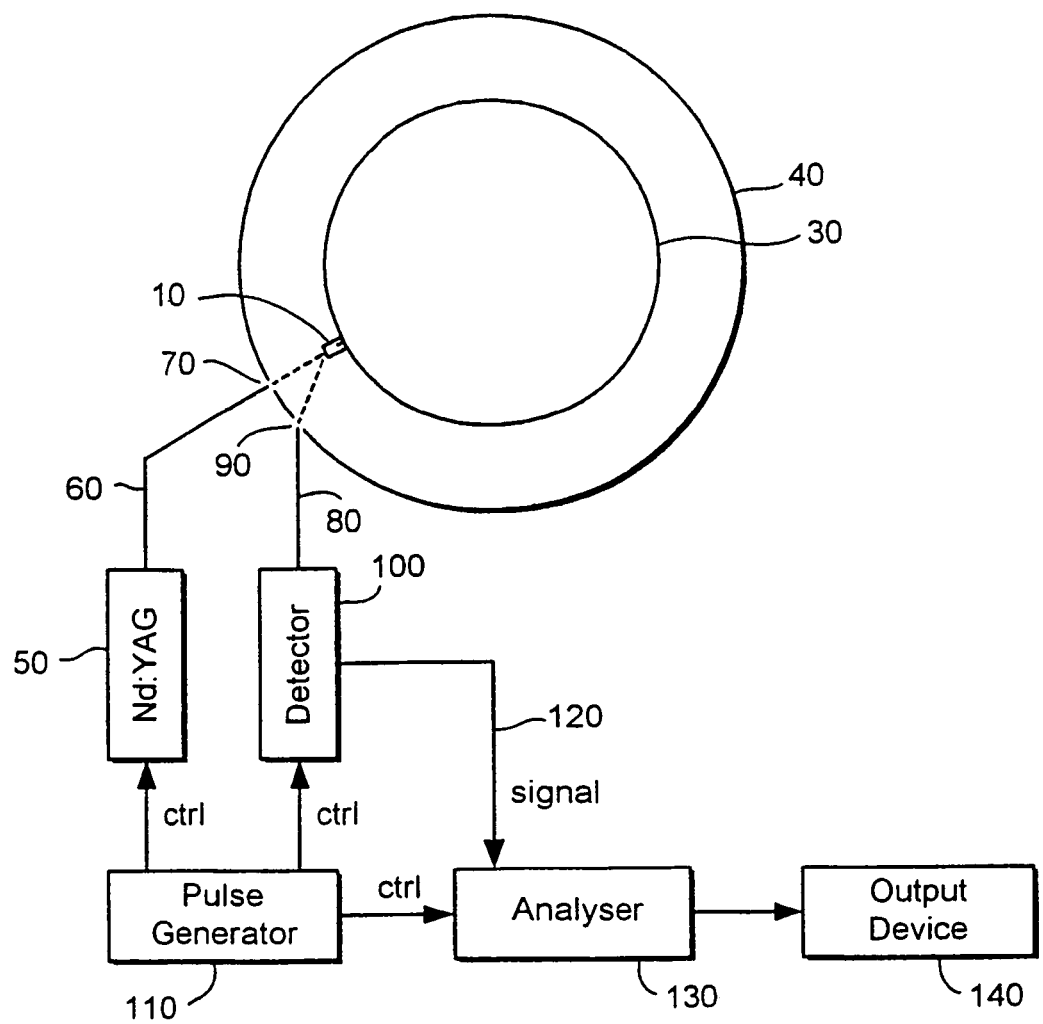
FIG. 2 is a schematic diagram of a gas turbine engine incorporating a coated component and having a remote sensing apparatus.

The coated component is particularly suited for remote monitoring of the physical parameter by directing an interrogating light beam on to the component and then analysing the fluorescence emissions returned from the component. FIG. 2 is a schematic diagram of a gas turbine engine incorporating the coated component and employing a remote sensing apparatus to detect the fluorescence spectrum of the component.

In FIG. 2, the coated component 10 is mounted on a turbine assembly 30 inside a casing 40 of the gas turbine engine. An interrogating light beam is generated by an Nd:YAG pulsed laser 50 and directed along an optical fibre waveguide 60 to a window 70 in the casing 40 of the turbine engine, from where it is directed onto the path of the component under test.

When the light strikes the component as it rotates past the window 70, the component's coating emits a fluorescence spectrum which is picked up by a further optical fibre 80 through a further window 90 in the casing 40. The light is passed to a detector 100.

An arrangement of lenses (not shown) can be used to collimate or otherwise vary the optical properties of the interrogating beam and/or the fluorescence emission. The optical fibre 60 and the optical fibre 80 can direct light through the same window in the casing 40 if desired, and, through use of a directional optical fibre coupler, the interrogating beam and the collected fluorescence spectrum can pass along the same fibre.

The laser 50 and the detector 100 are under the control of a pulse generator and control circuit 110. The detector 100 converts the received optical signal into an electrical signal 120 which is passed to an analyser 130 arranged to detect spectral characteristics to be described below using known analysis techniques. The output of the analyser 130 is passed to an output device 140 such as a display screen or a printout device.

The TBC is applied using a known technique such as chemical vapour deposition (CVD), electron beam physical vapour deposition (EBPVD), plasma spray deposition or electrostatic assisted vapour deposition (see, for example, WO97/21848). In this last technique, a precursor solution is directed onto the substrate (the component) and forms a deposited layer under heat treatment. An initial bondcoat and an interlayer (as described above but not shown in the drawings) may be deposited first to improve the adhesion and/or structural properties of the TBC coating.

The layer used in these embodiments is formed primarily of a refractory material but containing dopants, such as rare earth dopants, to provide the required fluorescence properties. Therefore, a straightforward way of applying such a coating is to add the rare earth dopants to the precursor solution before the electrostatic assisted vapour deposition coating process takes place. In further embodiments to be described below (see FIGS. 11 and 12) the composition of the indicator component varies across the depth of the coating. This type of graded or multi-phase structure can be achieved easily by varying the composition of the precursor solution during the coating process—perhaps by changing the concentration of a particular dopant by adding the dopant or adding more undoped precursor solution, or by changing from one receptacle of solution having a first dopant to another receptacle of solution having a second dopant (or no dopant), and so on. In the examples discussed below, the proportion of the dopant in the deposited layer is relatively small, so that the physical properties of the deposited layer and the deposition process itself are relatively unchanged by the addition of the dopant.

In other words, the addition of the rare earth to the thermally insulating layer in effect creates a new phosphor. This is very different to a technique for adding a phosphor to a layer material.

In a YSZ or YPSZ system the rare earths can also act to further stabilise the zirconia, improving the mechanical properties of the coating.

Two main techniques for assessing temperature by interrogating the coated components' fluorescence spectrum will be discussed below. These are a life time decay method and an intensity ratio method.

For the purposes of this example, three compositions will be discussed. $Y_2O_3$:Eu and YAG:Tb are described for the "lifetime decay method". These materials show good luminescence, are readily available and relatively cheap. Their useable temperature range goes from below 550° C. to above 1200° C.

The "intensity ratio method" will be described with relation to YAG:Dy material. This material has the possibility of performing two dimensional temperature distribution analysis up to temperatures of about 1500° C. Because the main emission lines of interest are below 500 nm, at high temperatures black body radiation from material is still not as intense as for similar measurements with $Y_2O_3$:Eu and YAG:Tb.

Lifetime Decay Method

Figure 3:
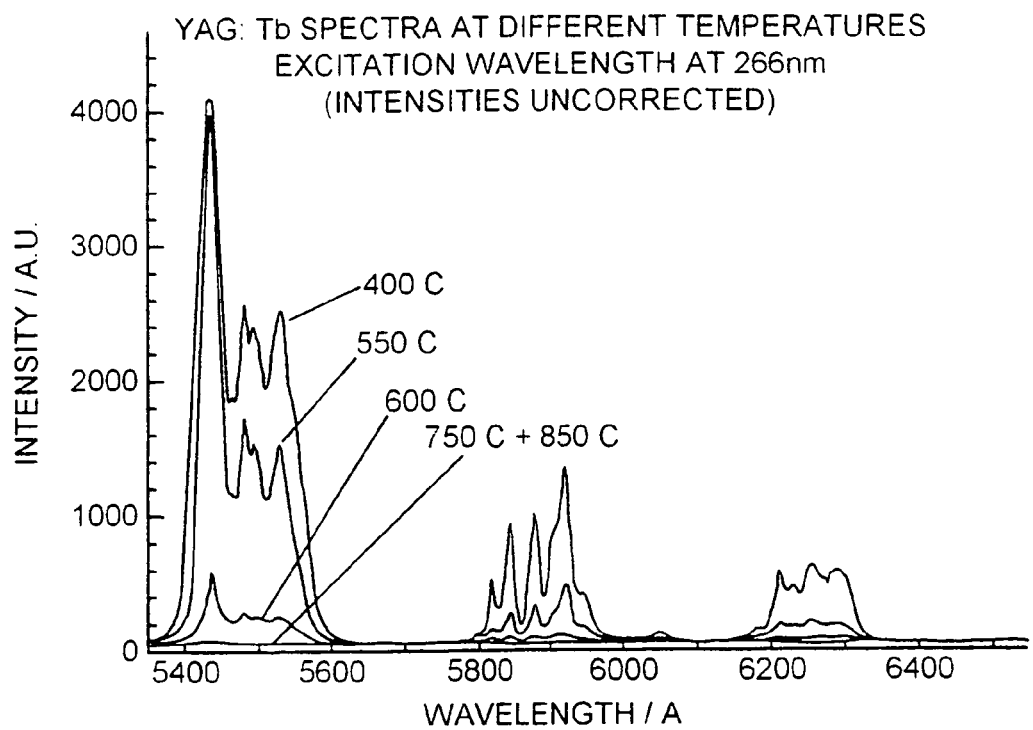
FIG. 3 illustrates a fluorescence spectrum for YAG:Tb.

FIG. 3 is a graph of the emission spectrum for YAG:Tb at different temperatures in response to an excitation wavelength of 266 nm. It will be seen that the spectrum varies in magnitude with temperature. However, the feature that will be analysed in the present example is the decay time of an emission after excitation.

When the material is excited by a pulse from the pulsed laser 50, it starts to fluoresce and emit the spectrum shown in FIG. 3. When the excitation pulse is removed, the intensity dies away exponentially. A characteristic time (tau) of the decay process is the time in which the intensity falls to 1/e of its original intensity. So, tau becomes numerically smaller as the decay becomes faster.

Figure 4:
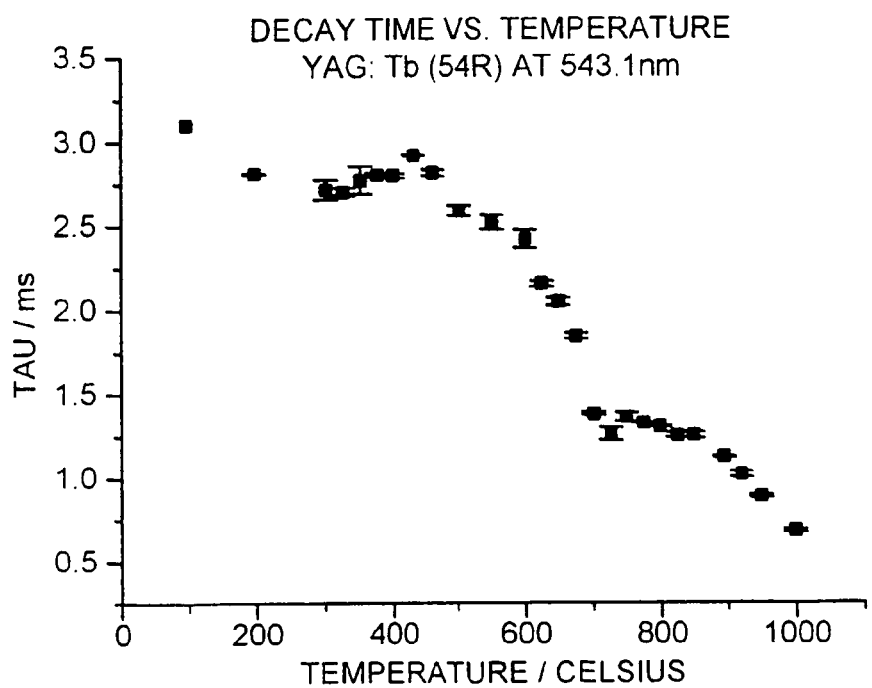

FIG. 4 is a graph of the decay time tau versus temperature for YAG:Tb at an emission wavelength of 543.1 nm, an excitation wavelength of 266 nm, and a Tb concentration of 5%, over a range from substantially room temperature through to about 1000° C. It can be seen that the characteristic time tau varies in dependence on the temperature of the material.

FIG. 5 is an expanded graph of the region from about 700° C. to about 1000° C. This is a region of interest for the temperature analysis of components in a combustion engine, and the graph shows that there is a generally monotonic between tau and temperature. Accordingly, the detector 100 can be arranged to detect intensity of the optical signal returned from the component 10 (FIG. 2) and the analyser 130 can be arranged to detect the characteristic decay time, i.e. the time in which the intensity decays by a factor of 1/e. This can then be compared—for example via a look-up table with the results of FIG. 5 to determine the temperature of the component 10.

Figure 7:
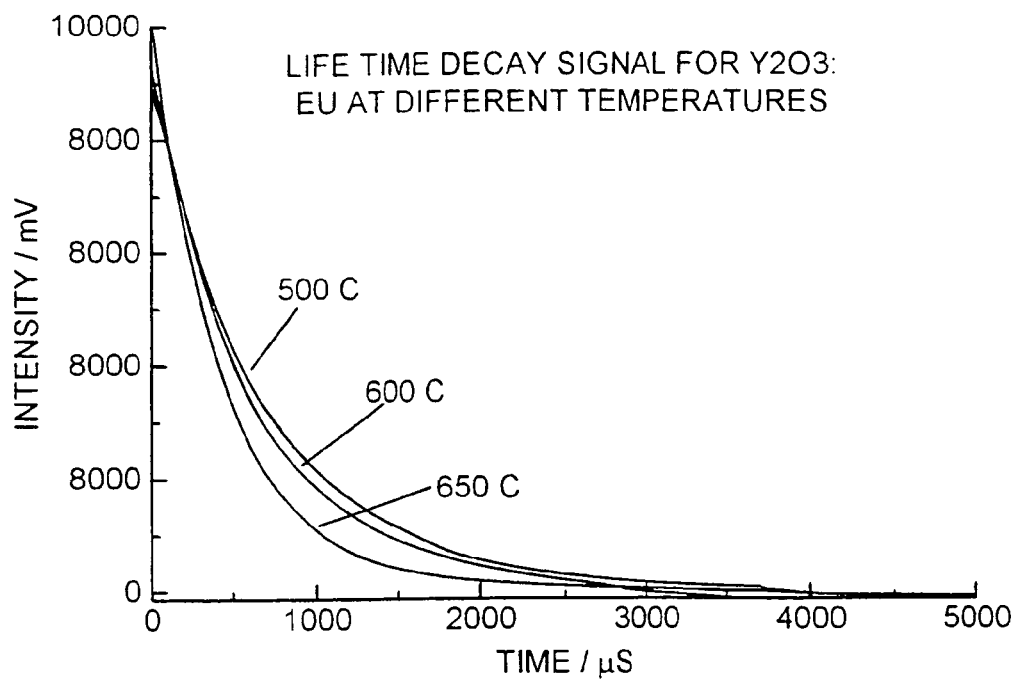
FIGS. 7 and 8 illustrate the variation of decay lifetime with temperature for an emission of $Y_2O_3$:Eu.
Figure 8:
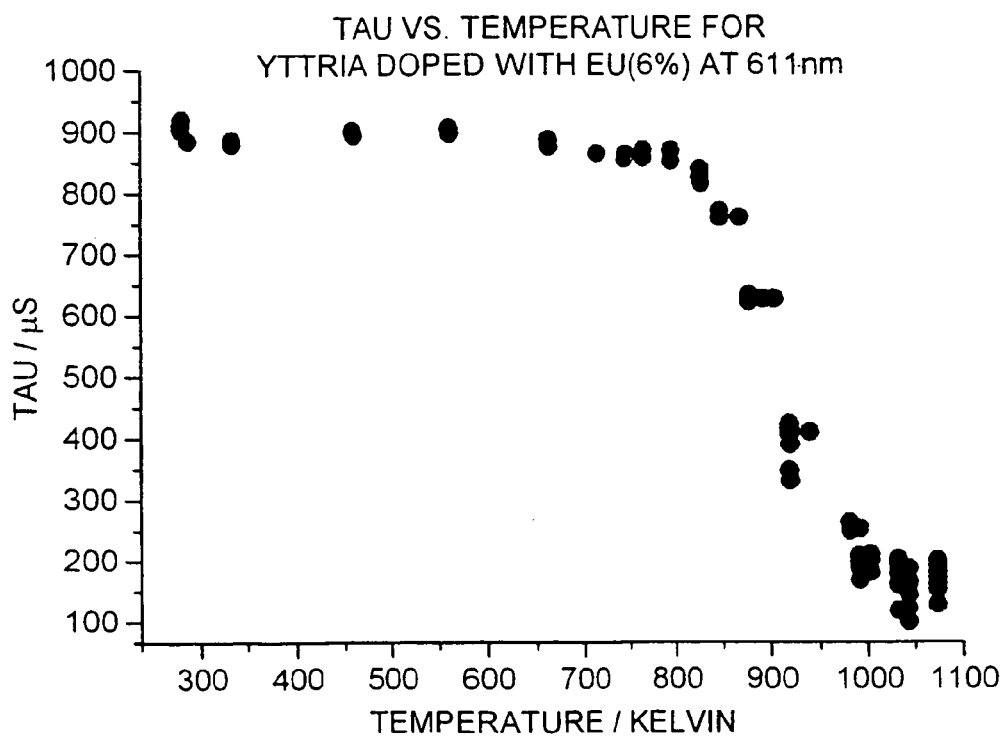

FIG. 7 illustrates the exponential decay process for an emission from $Y_2O_3$:Eu with temperature. The concentration of Eu is 6%, although a range of 1–6% is useful, the excitation wavelength 266 nm and the emission is measured is at 611 nm.

When the results of FIG. 7 are converted into a graph of the characteristic decay time tau versus temperature, it can be seen that in a temperature range of interest (above 700° C.) there is a useful variation of tau with temperature. This information can be used as described above in the analyser 130 of FIG. 2.

Intensity Ratio Method

Figure 9:
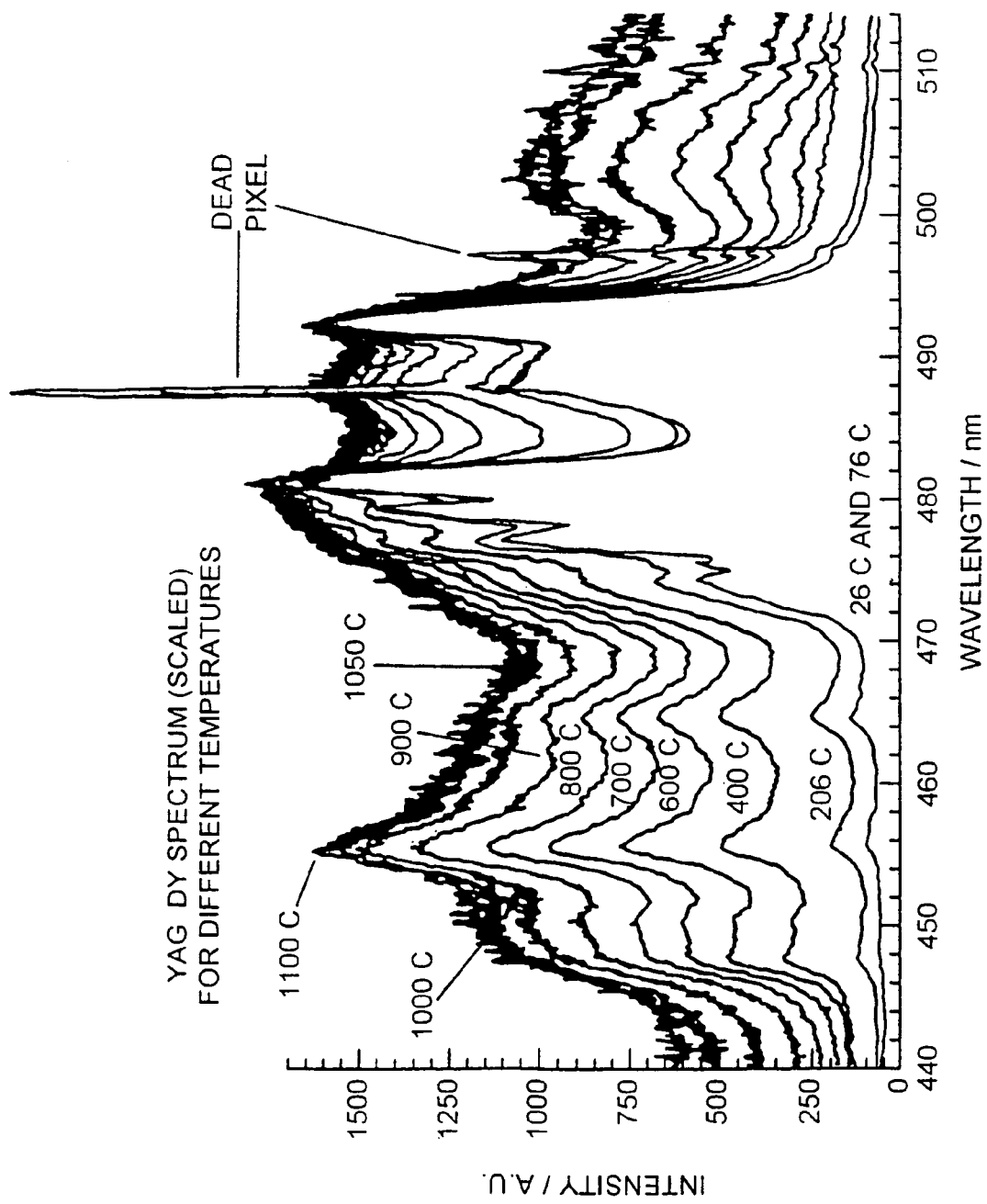
FIGS. 9 and 10 illustrate the relative variation of emission linestrengths with temperature for YAG:Dy.

FIG. 9 illustrates the scaled fluorescence spectrum for YAG:Dy at different temperatures. (The spectrum includes two "rogue" data points, marked as "dead pixels"). The Dy concentration is 3%.

Figure 10:
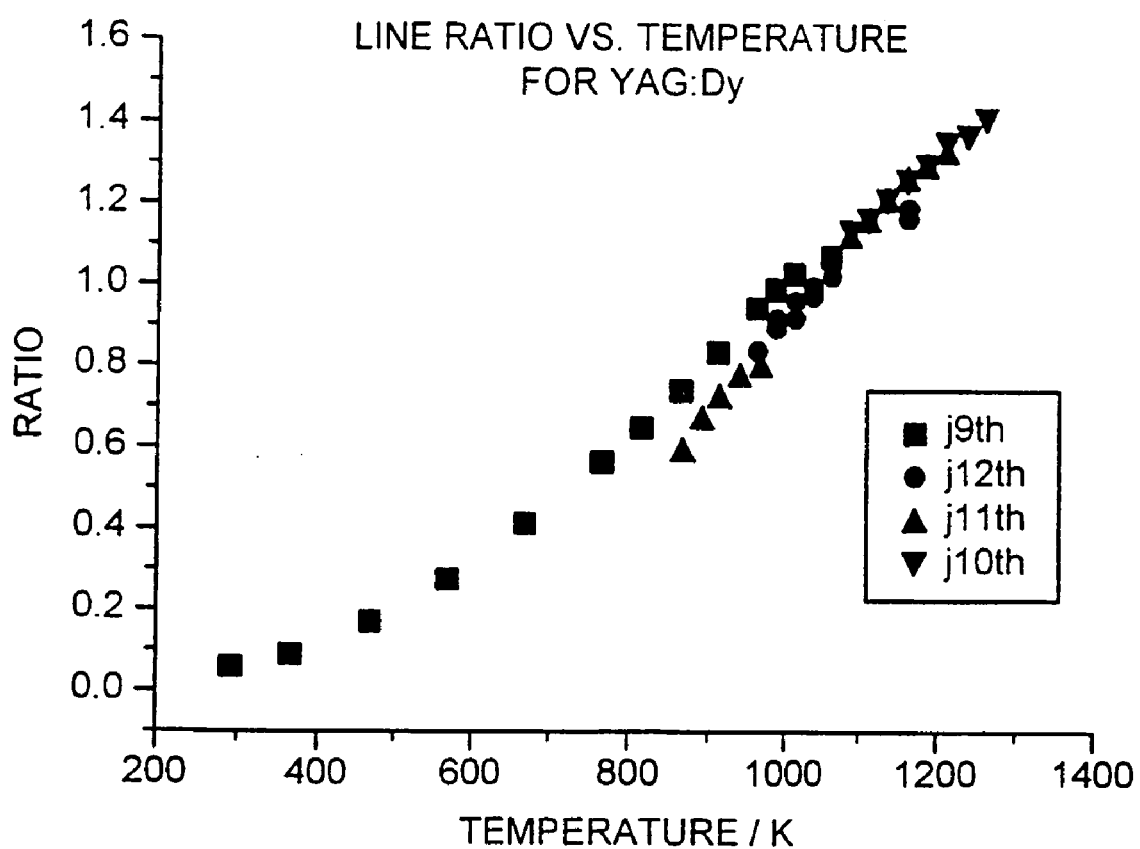

In a steady state emission (not a fluorescence emission), the ratio of intensities for two emission wavelengths (493 nm and 455 nm) in response to excitation at 355 nm is plotted against ambient temperature of the coated component in FIG. 10. This shows a useful, almost linear relationship between the ratio and the temperature.

In FIG. 10, sets of results obtained on different days are shown. These are day "j9th", the day of fabrication, and the next three days j10th to j12th. The results show a good stability of response with time.

Figure 11:
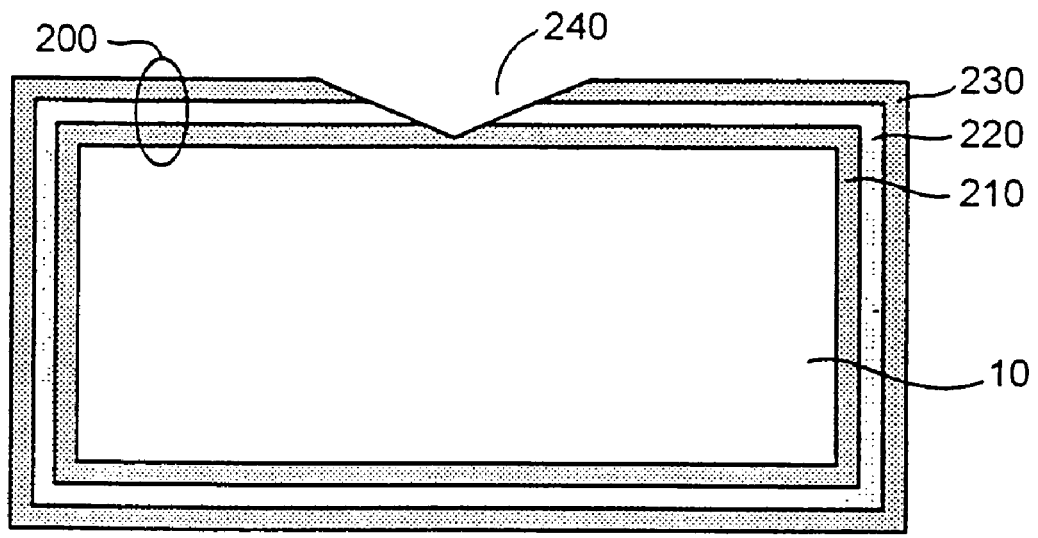
FIG. 11 is a schematic diagram of a multi-layer indicator material providing erosion information.
Figure 12:
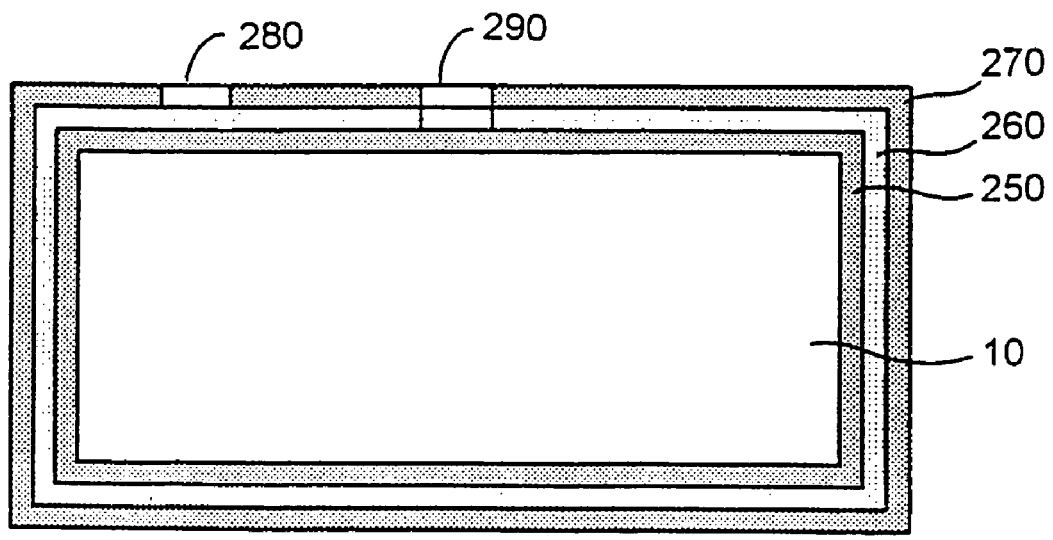
FIG. 12 is a schematic diagram of a multi-layer indicator material providing temperature monitoring at different coating depths.

The examples described above have related to single-layer coatings. However, as mentioned earlier, the composition of the indicator material can be varied during deposition of the TBC so as to give a TBC having multi-layer properties as regards the indicator material but single-layer properties as regards the thermal barrier protection. FIGS. 11 and 12 schematically illustrate two examples of such a multi-layer indicator structure.

Referring to FIG. 11, the component 10 is coated with a TBC 200 having three indicator layers within it, 210, 220, 230. The three indicator layers are formed using different indicator dopants.

This technique is very useful to assess erosion of the TBC. In FIG. 11, erosion has taken place at a site 240, so that areas of the interior indicator layers 220, 210 are exposed. When the eroded component is interrogated using the light beam as described above, emission spectra will be observed corresponding to all three of the indicator 210, 220, 230. This can be used to indicate that erosion has taken place as far as the layer 210. When this occurs, a warning signal can be issued to the equipment operator (e.g. a maintenance engineer maintaining a gas turbine engine) that it is time to dismantle the engine to replace the eroded component.

FIG. 12 illustrates a similar multi-layer structure having a three-indicator layer TBC formed of indicator layers 250, 260, 270. The three layers again have different respective fluorescence properties when interrogated by the interrogating light beam. A region 280 of the outer layer 270 is arranged to be substantially transparent (or at least partially transparent to the interrogating wavelength and the emission spectrum. This allows the temperature at a position inside the TIC (the position of the indicator layer 260 to be monitored. Similarly, a region 290 of the outer two layers 270, 260 is made at least partially transparent, so that the temperature of the interior layer 250 can be assessed, giving a closer indication of the temperature of the component 10 itself.

Such a multi-layer structure will also enable the heat flux to the component to be calculated assuming that the thermal conductivity of the intervening layer is known:

$$q''=(-k\Delta T)/L$$

where k is thermal conductivity, $\Delta T$ is the temperature change and L is the thickness of the layer.

In other embodiments a compositionally graded structure can be used (by varying the indicator material composition and/or concentration during deposition), or alternatively a composite or multi-phase structure can be employed.

Embodiments of the invention can provide a TBC with indicating properties which can be used to assess or measure the erosion, temperature distribution, heat flux, phase changes, pressure, stress and/or strain characteristics of a coated component, besides performing as a TBC.

The concentration of the indicator material is preferably relatively low so that its presence has little effect on the thermal properties of the TBC, but preferably high enough that the spectra can be conveniently observed. A preferred range is about 0.1%–0%, although concentrations outside of that range can be envisaged.

A further dopant regime forming an embodiment of the invention is $Y_2O_3$— Er (or other rare earth/s), YSZ with one or more rare earths or YPSZ with one or more rare earths.

Although embodiments of the invention have been described for use in non-invasive in-situ measurements, the techniques are also applicable to quality control and testing during coating development. If the detected temperature profile indicates a large variation across the top coat, this will create a large temperature mismatch and generate stresses in the coating material potentially leading to failure of the coating. The large variation could be due to non-uniformities in the coating or an exposure to a non-uniform thermal environment. In quality control, if the coating has not been deposited uniformly, this can cause a non-uniform temperature, stress and/or strain distribution in the coating and so cause failure. Again, this can be detected using the techniques described above.

What is claimed is:

1. A machine having one or more internal components coated with a thermal barrier coating having sufficient thickness and thermal and structural properties as to form an effective barrier between the one or more components and an extreme environment such as an interior of a gas turbine engine, the thermal barrier coating comprising a mixture of at least a refractory material and an indicator material having an optical emission spectrum which varies in response to a temperature of the respective component, wherein the machine comprises:
    a light source for directing an interrogating light beam onto the one or more components;
    a light collector for collecting light from the one or more components; and
    an analyzer for detecting at least a temperature of the one or more components by analysis of light collected from the one or more components.

2. The machine according to claim 1, wherein the one or more components is coated with one or more priming layers over which the thermal barrier coating is coated.

3. The machine according to claim 1, wherein the indicator material has an optical emission spectrum which varies in response to at least one other physical parameter of the respective component, and the analyzer is configured to detect the at least one other physical parameter of the one or more components by analysis of light collected from the one or more components.

4. The machine according to claim 3, wherein the indicator material has an optical emission spectrum which varies in response to at least one physical parameter selected from the group consisting of a physical strain applied to at least a region of the one or more components, erosion of at least a region of the one or more components, and a physical stress of at least a region of the one or more components.

5. The machine according to claim 1, wherein the refractory material is selected from the group consisting of yttria stabilised zirconia, yttria partially stabilised zirconia, and yttria aluminum garnet.

6. The machine according to claim 1, wherein the indicator material is a phosphor material.

7. The machine according to claim 1, wherein the indicator material comprises a rare earth dopant.

8. The machine according to claim 7, wherein the indicator material comprises a dopant selected from the group consisting of terbium, europium, and dysprosium.

9. The machine according to claim 1, wherein the indicator material comprises a compositionally-graded material, a composite material, or a multi-phase material.

10. The machine according to claim 1, wherein the thermal barrier coating comprises a layered structure, each of the layers including an indicator material having different respective emission spectra.

11. The machine according to claim 1, wherein the thermal barrier coating comprises a layered structure of an outermost, substantially transparent region and a region including an indicator material optically interogatable through the substantially transparent region.

12. The machine according to claim 1, wherein the machine is a combustion engine.

13. A gas turbine engine having one or more internal components coated with a thermal barrier coating having sufficient thickness and thermal and structural properties as to form an effective barrier between the one or more components and an extreme environment such as an interior of a gas turbine engine, the thermal barrier coating comprising a mixture of at least a refractory material and an indicator material having an optical emission spectrum which varies in response to a temperature of the respective component, wherein the gas turbine engine comprises:
    a light source for directing an interrogating light beam onto the one or more components;
    a light collector for collecting light from the one or more components; and
    an analyzer for detecting at least a temperature of the one or more components by analysis of light collected from the one or more components.

14. The gas turbine engine according to claim 13, wherein the one or more components is a turbine blade.

15. The gas turbine engine according to claim 13, wherein the one or more components is a heat shield.

16. A method of detecting at least a temperature of one or more components of a machine, comprising the steps of:
    providing a machine having one or more internal components coated with a thermal barrier coating having sufficient thickness and thermal and structural properties as to form an effective barrier between the one or more components and an extreme environment such as an interior of a as turbine engine, the thermal barrier coating comprising a mixture of at least a refractory material and an indicator material having an optical emission spectrum which varies in response to a temperature of the respective component;
    directing an interrogating light beam onto the one or more components;
    collecting light from the one or more components; and
    detecting at least a temperature of the one or more components by analysis of light collected from the one or more components.

17. The method according to claim 16, wherein the component is coated with one or more priming layers over which the thermal barrier coating is coated.

18. The method according to claim 16, wherein the indicator material has an optical emission spectrum which varies in response to at least one other physical parameter of the component.

19. The method according to claim 18, wherein the indicator material has an optical emission spectrum which varies in response to at least one physical parameter selected from the group consisting of a physical strain applied to at least a region of the component, erosion of at least a region of the component, and a physical stress of at least a region of the component.

20. The method according to claim 16, wherein the refractory material is selected from the group consisting of yttria stabilised zirconia, yttria partially stabilised zirconia, and yttria aluminium garnet.

21. The method according to claim 16, wherein the indicator material is a phosphor material.

22. The method according to claim 16, wherein the indicator material comprises a rare earth dopant.

23. The method according to claim 22, wherein the indicator material comprises a dopant selected from the group consisting of terbium, europium, and dysprosium.

24. The method according to claim 16, wherein the indicator material comprises a compositionally-graded material, a composite material, or a multi-phase material.

25. The method according to claim 16, wherein the thermal barrier coating comprises a layered structure, each of the layers including an indicator material having different respective emission spectra.

26. The method according to claim 16, wherein the thermal barrier coating comprises a layered structure of an outermost, substantially transparent region and a region including an indicator material optically interogatable through the substantially transparent region.

27. The method according to claim 16, wherein the component is a component of a combustion engine.

28. A method of detecting at least a temperature of one or more components of a gas turbine engine, comprising the steps of:

providing a gas turbine engine having one or more internal components coated with a thermal barrier coating having sufficient thickness and thermal and structural properties as to form an effective barrier between the one or more components and an extreme environment such as an interior of a gas turbine engine, the thermal barrier coating comprising a mixture of at least a refractory material and an indicator material having an optical emission spectrum which varies in response to a temperature of the respective component;

directing an interrogating light beam onto the one or more components;

collecting light from the one or more components; and detecting at least a temperature of the one or more components by analysis of light collected from the one or more components.

29. The method according to claim 28, wherein the component is a turbine blade.

30. The method according to claim 28, wherein the component is a heat shield.

* * * * *